(12) United States Patent
Park et al.

(10) Patent No.: US 9,823,168 B2
(45) Date of Patent: Nov. 21, 2017

(54) AUTO TIRE LOCALIZATION SYSTEMS AND METHODS UTILIZING A TPMS ANGULAR POSITION INDEX

(71) Applicant: Infineon Technologies AG, Neubiberg (DE)

(72) Inventors: Jooil Park, Sungnam (KR); Thomas Lange, Munich (DE)

(73) Assignee: Infineon Technologies AG, Neubiberg (DE)

( * ) Notice: Subject to any disclaimer, the term of this patent is extended or adjusted under 35 U.S.C. 154(b) by 535 days.

(21) Appl. No.: 14/317,063

(22) Filed: Jun. 27, 2014

(65) Prior Publication Data

US 2015/0377740 A1    Dec. 31, 2015

(51) Int. Cl.
| | | |
|---|---|---|
| *G01L 17/00* | (2006.01) | |
| *B60C 23/04* | (2006.01) | |
| *G01M 17/02* | (2006.01) | |
| *G01P 3/481* | (2006.01) | |

(52) U.S. Cl.
CPC ......... *G01M 17/02* (2013.01); *B60C 23/0416* (2013.01); *G01L 17/00* (2013.01); *G01P 3/481* (2013.01)

(58) Field of Classification Search
CPC . G01L 17/00; B60C 23/0416; B60C 23/0415; B60C 23/0408; B60C 23/804; B60C 23/02; B60C 23/0488
See application file for complete search history.

(56) References Cited

U.S. PATENT DOCUMENTS

| | | | |
|---|---|---|---|
| 3,823,354 A | 7/1974 | Janssen | |
| 4,041,026 A | 8/1977 | Ogata | |
| 5,055,786 A | 10/1991 | Wakatsuki | |
| 5,278,497 A | 1/1994 | Ariyoshi | |
| 5,418,455 A | 5/1995 | Takaishi et al. | |

(Continued)

FOREIGN PATENT DOCUMENTS

| | | |
|---|---|---|
| CN | 101762796 A | 6/2010 |
| CN | 101883690 A | 11/2010 |

(Continued)

OTHER PUBLICATIONS radioing.com, Tips for Electronic Printed Circuit Board Design, "PCB LAYOUT" section, Dec. 11, 2013.

(Continued)

*Primary Examiner* — Jill Culler
*Assistant Examiner* — Leo T Hinze
(74) *Attorney, Agent, or Firm* — Eschweiler & Potashnik, LLC

(57) ABSTRACT

Embodiments relate to tire localization systems and methods for tire pressure monitoring systems (TPMS). In embodiments, a tire pressure management system comprises a wheel speed sensor (WSS), a tire pressure sensor (TPS) that can comprise circuitry and/or sensors configured to measure or record tire pressure data and TPS phase data, and an electronic control unit (ECU) that can comprise circuitry and/or sensors configured to process the speed sensor data and TPS data. TPMS systems and methods utilize a reference position index transmitted by the TPS to determine a constant value pattern of WSS data representative of a specific tire in order to localize the set of tires.

16 Claims, 11 Drawing Sheets

(56) References Cited

U.S. PATENT DOCUMENTS

| | | |
|---|---|---|
| 5,548,151 A | 8/1996 | Funaki et al. |
| 5,645,527 A | 7/1997 | Beck |
| 5,747,995 A | 5/1998 | Spies |
| 6,064,202 A | 5/2000 | Steiner |
| 6,111,402 A | 8/2000 | Fischer |
| 6,326,782 B1 | 12/2001 | Schroeder |
| 6,362,618 B1 | 3/2002 | Motz |
| 6,727,563 B1 | 4/2004 | Hohe |
| 6,768,301 B1 | 7/2004 | Hohe |
| 6,917,088 B2 | 7/2005 | Takahashi |
| 6,946,834 B2 | 9/2005 | Van Zon et al. |
| 7,078,893 B2 | 7/2006 | Nakano et al. |
| 7,317,251 B2 | 1/2008 | Meyer-Berg |
| 7,425,821 B2 | 9/2008 | Monreal |
| 7,923,987 B2 | 4/2011 | Ausserlechner |
| 8,030,918 B2 | 10/2011 | Doogue |
| 8,058,866 B2 | 11/2011 | Granig et al. |
| 8,093,891 B2 | 1/2012 | Rocznik |
| 8,332,103 B2 * | 12/2012 | Greer ............... B60C 23/0489 180/167 |
| 8,409,415 B2 | 4/2013 | Liu |
| 8,659,411 B2 * | 2/2014 | Fink ............... B60C 23/0489 340/442 |
| 8,829,900 B2 | 9/2014 | Ausserlechner |
| 8,896,303 B2 | 11/2014 | Ausserlechner |
| 8,903,602 B2 * | 12/2014 | Bailie ............... B60C 23/0416 701/36 |
| 9,063,187 B2 | 6/2015 | Hellwig et al. |
| 9,103,853 B2 | 8/2015 | Ausserlechner et al. |
| 9,222,992 B2 | 12/2015 | Ausserlechner et al. |
| 9,279,864 B2 | 3/2016 | Ausserlechner et al. |
| 2003/0102909 A1 | 6/2003 | Motz |
| 2003/0179510 A1 | 9/2003 | Hayakawa |
| 2004/0085062 A1 | 5/2004 | Miyata et al. |
| 2005/0174112 A1 | 8/2005 | Wakabayashi et al. |
| 2005/0258840 A1 | 11/2005 | Ausserlechner |
| 2007/0170533 A1 | 7/2007 | Doogue et al. |
| 2007/0200564 A1 | 8/2007 | Motz et al. |
| 2007/0210298 A1 | 9/2007 | Finkelstein et al. |
| 2008/0197837 A1 | 8/2008 | Dulac |
| 2008/0297955 A1 | 12/2008 | Ausserlechner |
| 2009/0001965 A1 | 1/2009 | Ausserlechner et al. |
| 2009/0322325 A1 | 12/2009 | Ausserlechner |
| 2010/0156394 A1 | 6/2010 | Ausserlechner et al. |
| 2011/0071737 A1 | 3/2011 | Greer |
| 2011/0074405 A1 | 3/2011 | Doogue |
| 2011/0199623 A1 | 8/2011 | Okuyama |
| 2012/0001279 A1 | 1/2012 | Hioka et al. |
| 2012/0029767 A1 | 2/2012 | Bailie |
| 2013/0043865 A1 | 2/2013 | Makuth et al. |
| 2013/0085710 A1 | 4/2013 | Kautzsch |
| 2013/0265036 A1 | 10/2013 | Friedrich et al. |
| 2013/0265041 A1 | 10/2013 | Friedrich et al. |
| 2013/0335072 A1 | 12/2013 | Malzfeldt |
| 2014/0042410 A1 | 2/2014 | Chen |
| 2014/0176323 A1 * | 6/2014 | Kim ............... B60C 23/0408 340/442 |
| 2014/0195107 A1 * | 7/2014 | Park ............... B60C 23/0416 701/34.4 |
| 2014/0203803 A1 | 7/2014 | Ming |
| 2014/0218019 A1 | 8/2014 | Ausserlechner |
| 2014/0266163 A1 | 9/2014 | Schaffer |
| 2014/0347045 A1 | 11/2014 | Paul |
| 2015/0044778 A1 | 2/2015 | Wang |
| 2015/0102808 A1 | 4/2015 | Ogomi et al. |
| 2015/0115932 A1 | 4/2015 | Michelutti et al. |
| 2015/0137797 A1 | 5/2015 | Ausserlechner |
| 2015/0219472 A1 | 8/2015 | Ausserlechner |
| 2015/0253157 A1 | 9/2015 | Granig |
| 2015/0285661 A1 | 10/2015 | Ausserlechner |
| 2015/0309127 A1 | 10/2015 | Ausserlechner |
| 2015/0323568 A1 | 11/2015 | Schmitt |
| 2015/0323613 A1 | 11/2015 | Ausserlechner |
| 2015/0323614 A1 | 11/2015 | Ausserlechner |
| 2015/0331070 A1 | 11/2015 | Koeck et al. |
| 2015/0354999 A1 | 12/2015 | Ausserlechner |
| 2016/0041238 A1 | 2/2016 | Bai |
| 2016/0178397 A1 | 6/2016 | Jost |
| 2017/0153301 A1 | 6/2017 | Ausserlechner |

FOREIGN PATENT DOCUMENTS

| | | |
|---|---|---|
| CN | 101923266 A | 12/2010 |
| DE | 4302342 | 7/1993 |
| DE | 10150950 C1 | 6/2003 |
| DE | 102006037226 A1 | 2/2008 |
| EP | 1438755 | 1/2005 |
| JP | 1251763 | 10/1989 |
| WO | 2004/025742 | 3/2004 |
| WO | 2008/048379 A1 | 4/2008 |
| WO | 2009/506733 | 4/2009 |

OTHER PUBLICATIONS

Zhu et al., Localization of a Stationary Source within a Uniform Circular Sensor Array, IEEE, 2007.

Non Final Office Action dated May 4, 2016 U.S. Appl. No. 14/299,563.

Ausserlechner, Udo. "Limits of Offset Cancellation by the Principle of Spinning Current Hall Probe." Infineon Technologies AG, 4 pages, Oct. 2004.

Vanha, Ralph. "Trench-Hall Devices". Journal of Microelectromechanical Systems, vol. 9, No. 1, Mar. 2000, pp. 82-87.

Munter, P J A. "A Low-Offset Spinning-current Hall Plate," Sensors and Actuators, A21-A23, 1990, pp. 743-746.

De Jong, Paul C. "40.1 Smart Silicon Sensors—Examples of Hall-effect Sensors." Sensors 2002 Proceedings of IEEE, 5 pages.

German Office Action, Application No. 102013110333.1, dated Jun. 2, 2014, 7 pages.

Chinese Office Action, Application No. 201210345928.4, dated Oct. 10, 2014, 14 pages.

"Chip Cart, & Security ICs," Infineon Technologies AG, SLM76CF5120P, Short Product Information 11.08, 9 pages.

"Angle Sensor, GMR-Based Angular Sensor." Data Sheet, TLE5009, Rev. 1.1, Apr. 2012, 32 pages.

"Angle Sensor, GMR-Based Angle Sensor." Data Sheet, TLE5012B, V 1.1, Jan. 2012 Final, 49 pages.

Notice of Allowance, U.S. Appl. No. 13/753,190 dated Jun. 23, 2015.

Final Office Action, U.S. Appl. No. 13/753,190 dated Apr. 6, 2015.

Non-Final Office Action, U.S. Appl. No. 13/753,190 dated Oct. 8, 2014.

Non Final Office Action Dated Oct. 14, 2016 U.S. Appl. No. 14/886,864.

Non-Final Office Action dated Jun. 17, 2016 for U.S. Appl. No. 14/886,864.

Notice of Allowance dated Mar. 15, 2017, for U.S. Appl. 14/886,864.

Baker, Bonnie. PCB signal coupling can be a problem, www.edn.com/electronics-blogs/bakers-best/4426162/PCB-signal-coupling-can-be-a-problem, Dec. 2013.

Bailey, Michael. General Layout Guidelines for RF and Mixed-Signal PCBs. www.maximintegrated.com/en/app-notes/index.mvp/id/5100. Sep. 2011.

Notice of Allowance dated Nov. 14, 2016 U.S. Appl. No. 14/299,563.

Non-Final Office Action dated Jun. 16, 2017 in connection with U.S. Appl. No. 15/432,167.

\* cited by examiner

AUTO TIRE LOCALIZATION SYSTEMS AND METHODS UTILIZING A TPMS ANGULAR POSITION INDEX

TECHNICAL FIELD

Embodiments relate generally to tire localization in tire pressure monitoring systems (TPMS), and more particularly to automatic tire localization utilizing tire pressure sensor (TPS) and wheel speed sensor (WSS) data.

BACKGROUND

In vehicle tire pressure monitoring systems, the TPMS must determine the exact sensor location (e.g. front left (FL), front right (FR), rear left (RL), or rear right (RR)) in order to correctly identify the location of the tire with low pressure. The location can then be displayed by the system (for example, in a dashboard TPMS display unit). A determination of the location of a particular tire is often referred to as "tire localization." A determination of the location of a particular tire made automatically by the TPMS itself is often referred to as "automatic tire localization."

Generally, solutions for automatic tire localization use correlations between the phase information of TPS and anti-lock brake system (ABS) WSS signals. There are two typical approaches to these solutions.

According to a first approach, a TPS sends radio frequency (RF) signal(s) only when the TPS reaches a single predetermined reference position. A TPMS receiver, for example, an electronic control unit (ECU), receives the RF signal and calculates the tire location based on the angular position and WSS counter information that was acquired at the moment the RF signal was received.

There are several disadvantages in this first approach. The most common way to detect the phase (angle) of a TPS is to use an acceleration senor in the TPS module for motion detection. Most TPS therefore have at least one acceleration sensor or shock sensor. A measuring of the TPS phase and frequency requires some time to be collected (a "sampling time"). In another disadvantage of this first approach, the TPS also requires some additional time to calculate the phase and frequency information for a given sampling data set due to limitation of CPU processing time (a "processing time"). In yet another disadvantage of this first approach, an RF transmission at the single fixed phase) must wait until the TPS reaches the reference position (a "waiting time") to transmit the RF frame. This waiting time can be calculated by an extrapolation method based on the phase and frequency information of given sample points. Sampling time delays and processing time delays are typical across many tire localization solutions. However, waiting time is an additional delay unique to the aforementioned first approach.

Furthermore, waiting time depends on the vehicle speed and the time sampling and processing time was conducted. Effectively, the waiting time is a random value, and can range between a few microseconds second up to a few hundred milliseconds, because the moment at which data is sampled is random (phase and time are random) but also the vehicle speed (and wheel radius) is effectively random. This waiting time directly effects energy consumption and battery life, which is one of most critical design factors of TPMS applications. During the waiting time, the CPU of the TPS has to consume more energy because most CPUs cannot enter a low energy mode because the TPS must keep a high resolution and accurate time tracking. Additionally, the waiting time can increase the phase error if the waiting time is long and the vehicle undergoes acceleration or deceleration during the extrapolation period. Further, most OEM TPMSs specify a guideline for the RF transmission interval. If the vehicle speed is low, the TPS can potentially be out of specification with the OEM regulation.

According to a second approach, a TPS sends an RF frame, wherein the RF frame includes angular position and time information for when the angular position was measured. A TPMS receiver, for example, an ECU, receives the RF signal and calculates each tire location based on the angular position, time information, and WSS counter information that was acquired for the moment the angular position was measured.

There are several disadvantages in this second approach. The RF frame must include additional time and phase information that frames of other approaches, such as the frame of the first approach described above. A longer frame length can have more current consumption compared to shorter RF frame lengths at the same conditions. In another disadvantage of this second approach, the failure rate for RF transmission/receiving can be increased due to the longer data frame. In yet another disadvantage of this second approach, the ECU receiver must record WSS counter values for each wheel and store the WSS counter values for some duration, which requires additional memory space compared to other approaches. Likewise, the ECU receiver must incorporate complex processing instructions in order to search the WSS counter values for each wheel.

SUMMARY

In an embodiment, a tire localization system comprises a plurality of wheel speed sensors each associated with a respective wheel of a vehicle and configured to provide a wheel speed signal; a plurality of tire pressure sensor (TPS) subsystems each associated with a respective wheel of the vehicle and configured to provide an index comprising a TPS subsystem location associated with the wheel; and an electronic control unit operably coupled to the plurality of wheel speed sensors and the plurality of TPS subsystems and configured to process the wheel speed signal and the index to localize each of the plurality of TPS subsystems to a particular wheel of the vehicle.

In an embodiment, a method of localizing a wheel in a tire pressure monitoring system (TPMS) comprises providing a tire pressure sensor (TPS) subsystem at one of a plurality of wheels of a vehicle; communicating, at an index location, the index location to an electronic control unit, wherein the index location is one of a plurality of indices spaced along the wheel of the vehicle and related to the TPS; acquiring wheel speed data for each of the plurality of the wheels of the vehicle; communicating the wheel speed data to the electronic control unit; and identifying, by the electronic control unit, the TPS subsystem corresponding to one of the plurality of wheels of the vehicle based on the index location and the wheel speed data.

In an embodiment, a tire pressure monitoring system (TPMS) for a vehicle including a plurality of tires, the system comprises a plurality of tire pressure sensors (TPS) each associated with a tire of the vehicle and configured to provide a data frame including a TPS identifier, a tire pressure signal, and a phase signal associated with the location of the TPS along the tire; and an anti-lock brake (ABS) system including a plurality of wheel speed sensors each associated with a tire of the vehicle and configured to provide a wheel speed signal, and an electronic control unit (ECU) operably coupled to the plurality of wheel speed sensors and the plurality of tire pressure sensors and configured to process the data frame and the wheel speed signals to determine a location of at least one of the TPS for a tire of the vehicle.

BRIEF DESCRIPTION OF THE DRAWINGS

The invention may be more completely understood in consideration of the following detailed description of various embodiments of the invention in connection with the accompanying drawings, in which.

Figure 1:
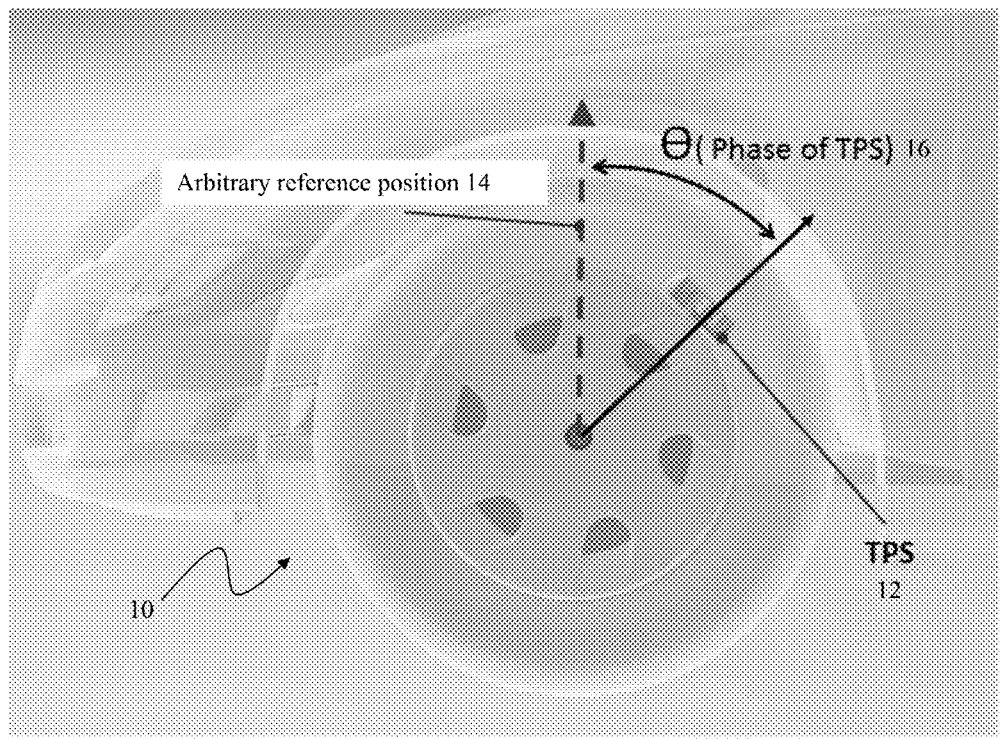
FIG. 1 is a side view of a vehicle tire including a TPS, according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Embodiments relate to tire localization in tire pressure monitoring systems (TPMS) and automatic tire localization utilizing tire pressure sensor (TPS) data and wheel speed sensor (WSS) data. In embodiments, a tire pressure management system comprises a wheel speed sensor (WSS), a tire pressure sensor (TPS) that can comprise circuitry and/or sensors configured to measure or record tire pressure data and TPS phase data, and an electronic control unit (ECU) that can comprise circuitry and/or sensors configured to process the speed sensor data and TPS data. TPMS systems and methods utilize a reference position index transmitted by the TPS to determine a constant value pattern of WSS data representative of a specific tire in order to localize the set of tires.

Referring to FIG. 1, a front left tire 10 of a vehicle having an operably coupled TPS 12 is depicted. A reference position 14 can be located at any point along the circumference of tire 10. A phase (angle) 16 corresponds to the relative angle along the circumference of tire 10 of TPS 12 to reference position 14, wherein the center of tire 10 is the vertex of phase 16.

Figure 2:
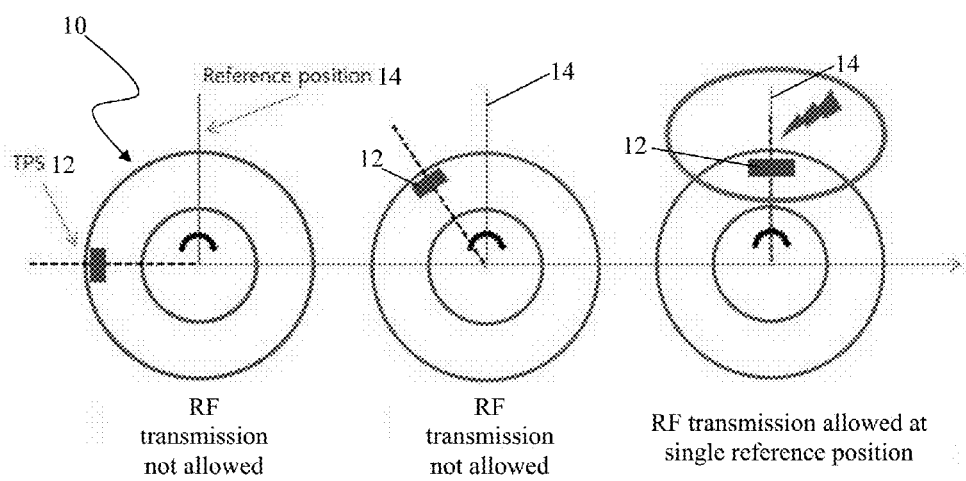
FIG. 2 is a series of block diagrams of a vehicle tire including a TPS in relation to a reference position graphed against time for automatic tire localization, according to an embodiment.
Figure 3:
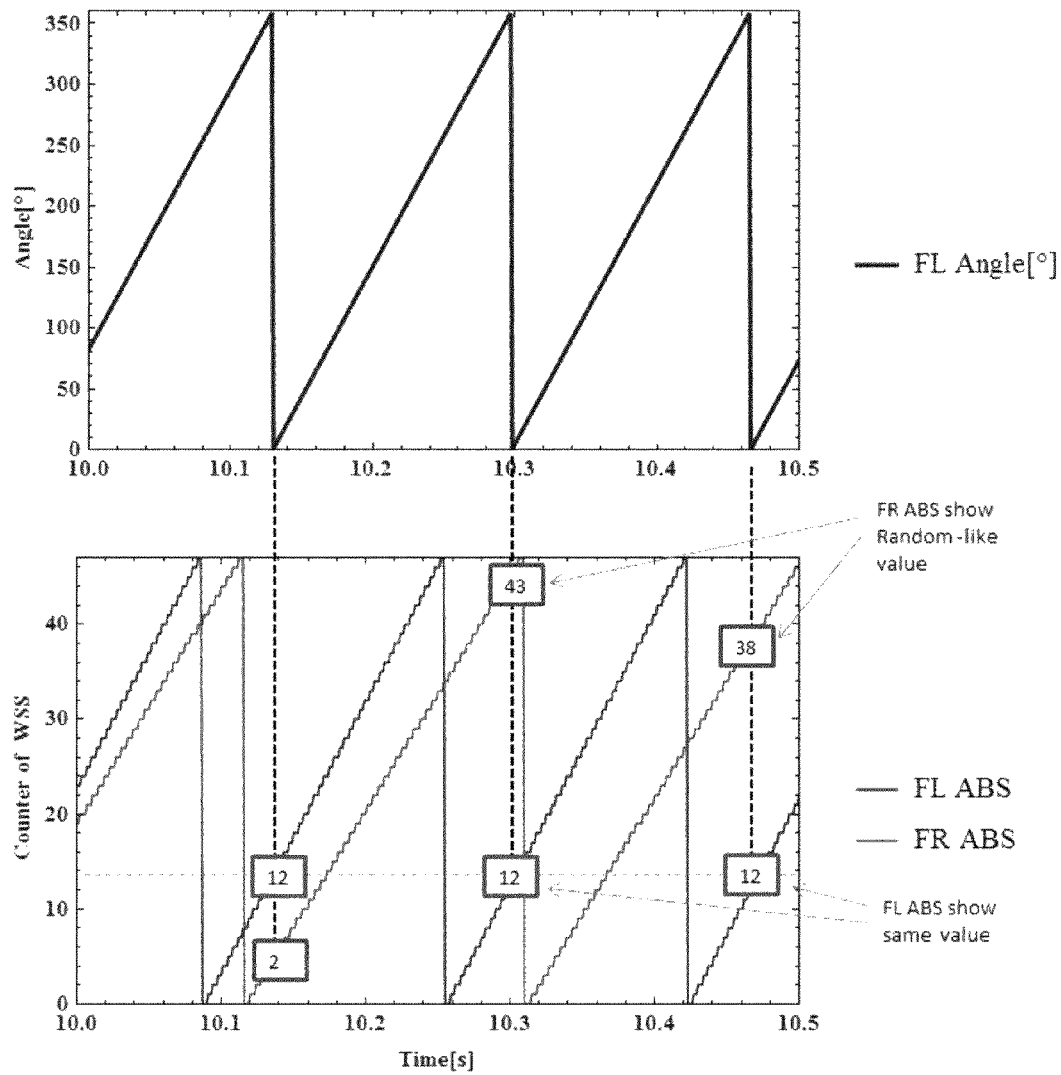
FIG. 3 is two annotated graphs depicting the relationship of angular position and WSS counter data against time for a front left vehicle tire and a front right vehicle tire having different revolutions per minute for automatic tire localization, according to an embodiment.

Referring to FIG. 2, TPS 12 is configured to transmit an RF signal when TPS 12 reaches reference position 14. As a result, the TPS data and WSS counter information are used in combination in order to perform tire localization. Referring to FIG. 3, the relationship of angular position and WSS counter data against time are depicted for a front left vehicle tire and a front right vehicle tire having different revolutions per minute. For example, front left TPS 12 sends an RF frame when the front left TPS reaches reference position 14 (e.g. zero degrees as depicted in FIG. 2). At the same time, an ECU receiver collects individual ABS WSS counter values from four wheel speed sensors at the moment the ECU receives an RF frame. The ECU receiver can identify the same WSS counter value from the FL WSS only when the ECU receives an RF frame from FL TPS. In FIG. 3, the FL ABS provides the same WSS value ("12"). Other WSSs (FR, RR, and RL) provide essentially random WSS counter values, because rotation speed of each wheel is different due to, for example, cornering effects or differences in effective rolling radius. In FIG. 3, the FR ABS, for example, provides values of "2," "43," and "38," Therefore, the TPMS can conduct tire localization by matching the ABS WSS that provides a consistent counter value at the moment the ECU receives an RF signal.

Figure 4:
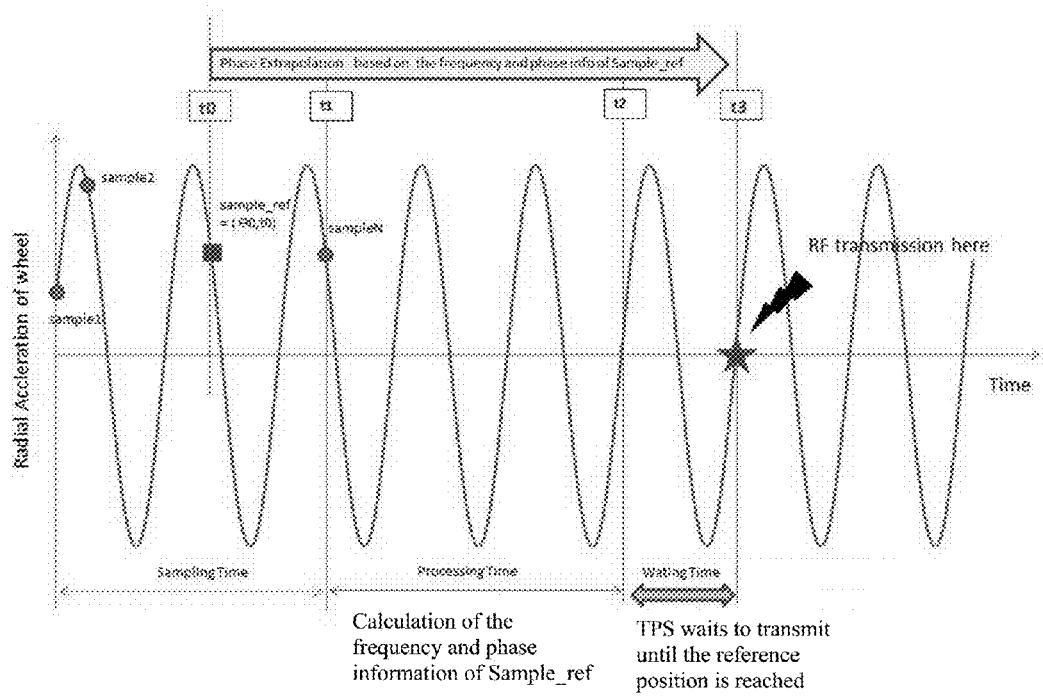
FIG. 4 is a graph of radial acceleration of a wheel against time for automatic tire localization, according to an embodiment.

Referring to FIG. 4, a sinusoidal signal is generated when the wheel is rotating. The sinusoidal signal can be analyzed to find out the phase of specific samples, and also the frequency information for given sampled data by using, for example, sinusoidal function fitting algorithms.

Figure 5:
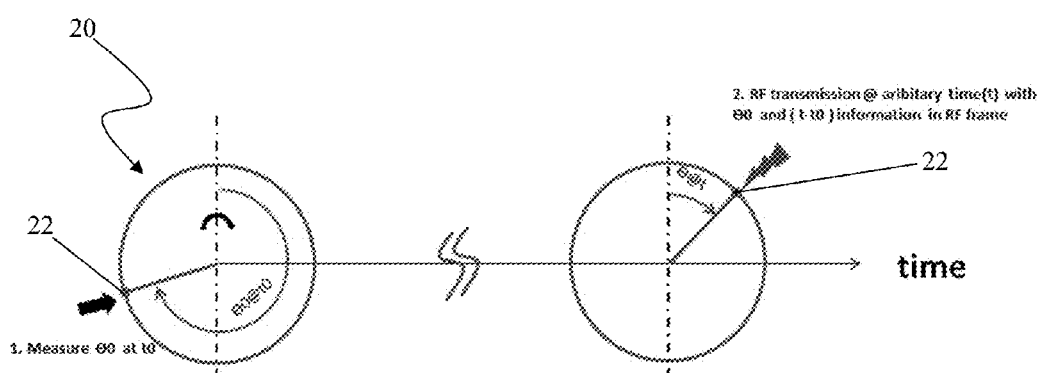
FIG. 5 is a series of block diagrams for a vehicle tire including a TPS graphed against time for automatic tire localization, according to an embodiment.
Figure 6:
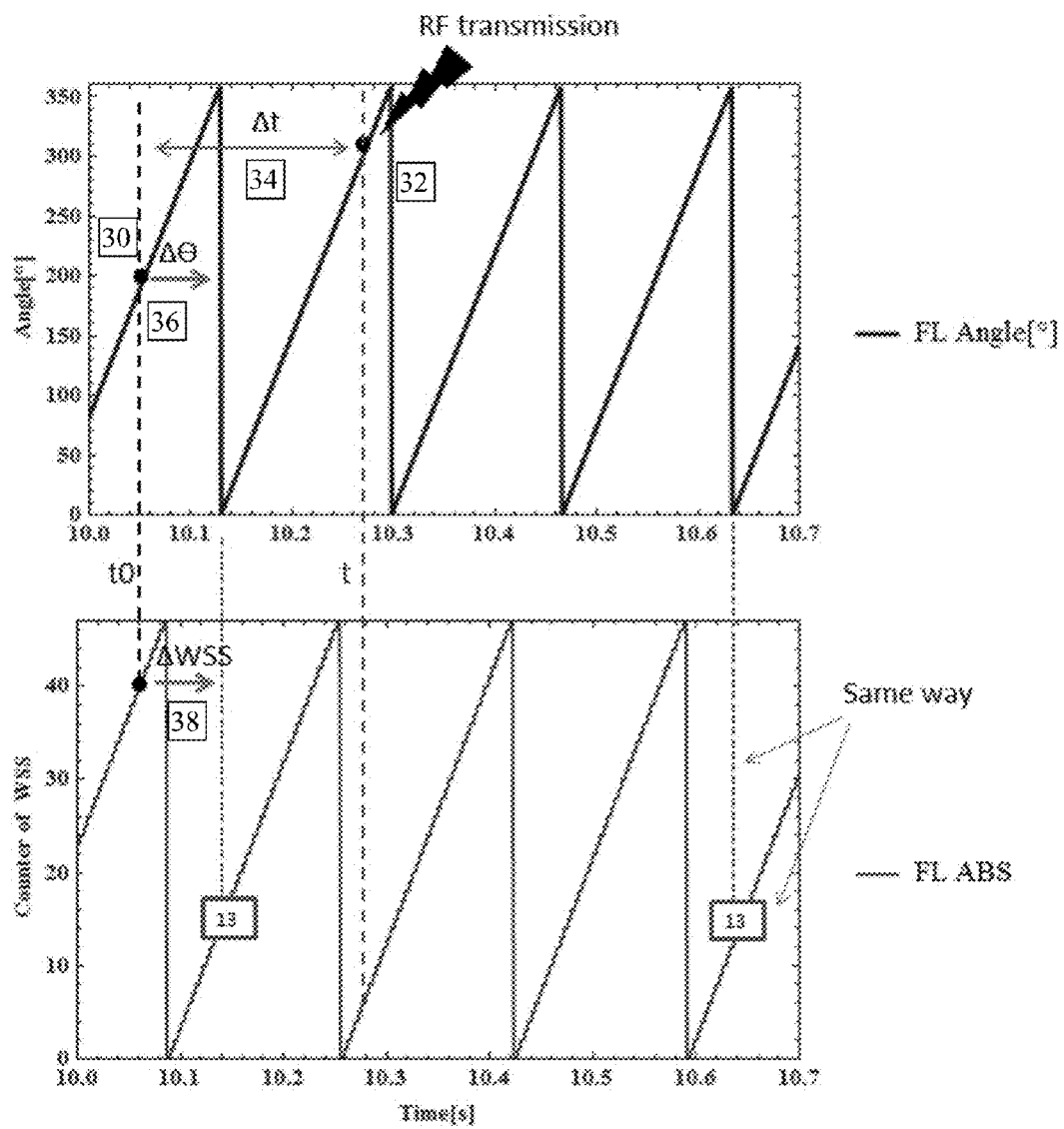
FIG. 6 is two annotated graphs depicting the relationship of angular position and WSS counter data against time for a front left vehicle tire for automatic tire localization, according to an embodiment.

Referring to FIG. 5, tire 20 is substantially similar to tire 10 as described above, wherein tire 20 includes an operably coupled TPS 22. TPS 22 can transmit an RF frame at any time along the relative rotation through the circumference of tire 20. Referring to FIG. 6, the relationship of angular position and WSS counter data is depicted against time for a front left vehicle. For example, at 30 as depicted in FIG. 6, TPS 22 is configured to measure both angle and time ($\theta 0$, $t0$) at an arbitrary time. At 32, TPS transmits an RF frame containing angle and time ($\theta 0$, $\Delta t=t-t0$) information for arbitrary time (t). At 34, an ECU receiver searches WSS counter values at $t0=t-\Delta t$ for all WSS sensors from memory storing previous WSS counter records and time records. As a result, the ECU receiver records four WSS counter values and stores those counter values for later reference. At 36, the ECU receiver calculates the angle difference ($\Delta\theta$) between the reference position and the measured angle ($\theta 0$) at $t0$. The ECU receiver is configured to calculate an WSS counter correction by converting the angle difference to a number of pulses of WSS and adding a WSS counter correction to all WSS counter values at $t0$.

In an embodiment, the conversion is by: ($\Delta\theta/(360/$number of teeth of wheel)).

Figure 7:
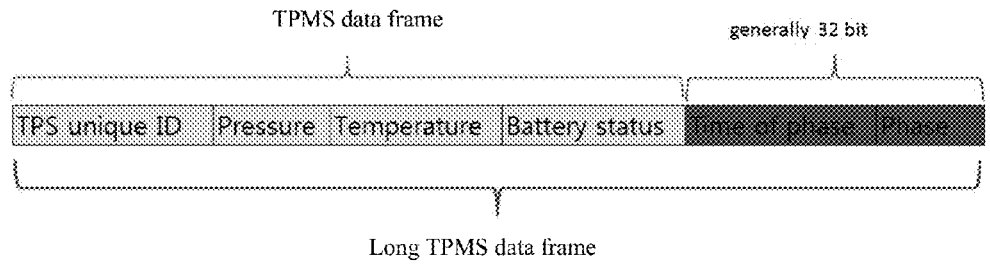
FIG. 7 is a block diagram of an RF frame for automatic tire localization, according to an embodiment.

At 38, the ECU can identify the FL WSS counter that has the same counter value calculated at 36 at the time the ECU received the RF signal from the FL TPS. In FIG. 6, the FL ABS provides the WSS value ("13"). Other WSS counter values appear randomly distributed. By repeating this procedure, the ECU receiver can match each TPS ID to each ABS WSS, each of which provides respectively similar WSS counter values. Referring to FIG. 7, a block diagram of an exemplary RF frame including the time of sampling and phase information is depicted.

Figure 8:
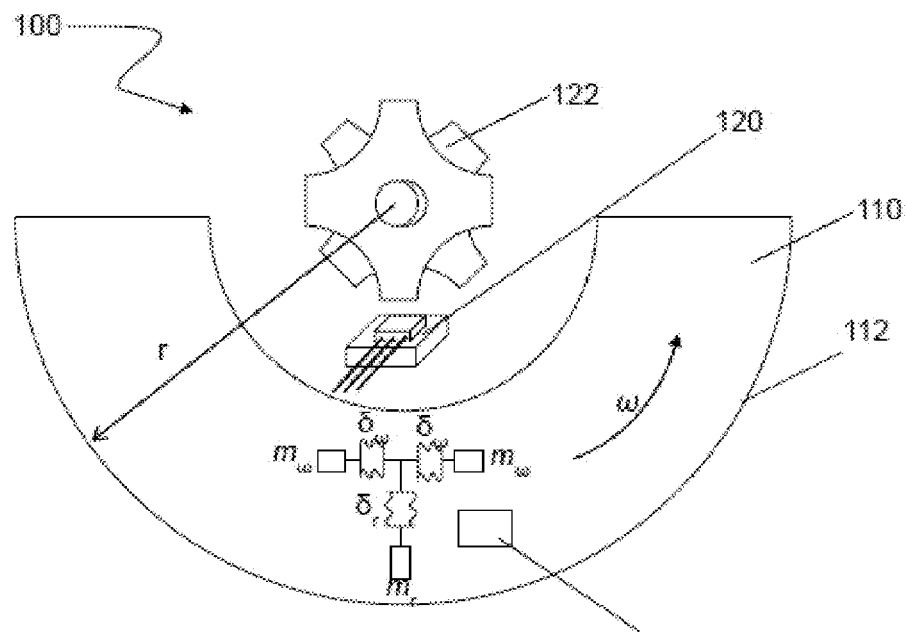
FIG. 8 is a schematic diagram of a wheel sensor system and tire, according to an embodiment.

Referring to FIG. 8, a schematic diagram of an embodiment of an TPMS wheel sensor system 100 in accordance with an embodiment is depicted. Wheel 110 is shown with a tire 112 and an ABS sensor system 120. The particular relative positions of ABS sensor system 120 and wheel 110 are merely exemplary and can vary in embodiments. Moreover, components in this and other figures herein are not necessarily drawn to scale. Because wheel 110 is a complex structure, there should be a multitude of resonances in response to complex vibrations occurring during movement. Embodiments utilize these multiple resonances to locate and isolate resonance peaks of different resonance modes, e.g., a radial vibration, r, and an angular vibration, $\omega$. Thus, tire 112 can be modeled as a complex arrangement of mechanical resonators, $\delta_\omega$ and $m_\omega$ for angular vibration, and $\delta_r$ and $m_r$ for radial vibration. In some embodiments, the vibration of tire 112 can be modeled as a two-dimensional model of mechanical resonators, while in other embodiments, tire 112 can be modeled as a three-dimensional model of mechanical resonators.

In some embodiments, the vibrations of the tire 112, can be monitored or sensed, such as by one or more sensors 114 mounted in or on, affixed to, embedded in, or otherwise coupled to tire 112. In other embodiments, one or more sensors 114 can be mounted proximate but not in or on tire 112, such as on a rim, wheel, axel, vehicle body or other suitable place, though sensors so positioned may not be able to sense actual tire characteristics, such as material temperature. In other embodiments, one or more sensors 114 comprises a pressure sensor for direct measurement of the pressure of tire 112. In some embodiments, the digitized information can be modulated onto the conventional ABS wheel speed clock signal generated by, for example, an encoder tooth wheel 122, for transmission to and analysis by an electronic control unit (ECU). According to embodiments, additional information about multidimensional resonances of the sensed signal that can include higher-order harmonics of the wheel rotation can be provided to the ECU, which can then be utilized to calculate a more accurate estimation of tire pressure while reducing warning latency, thereby providing a more robust system that balances provision of early warnings with false alarms.

Figure 9:
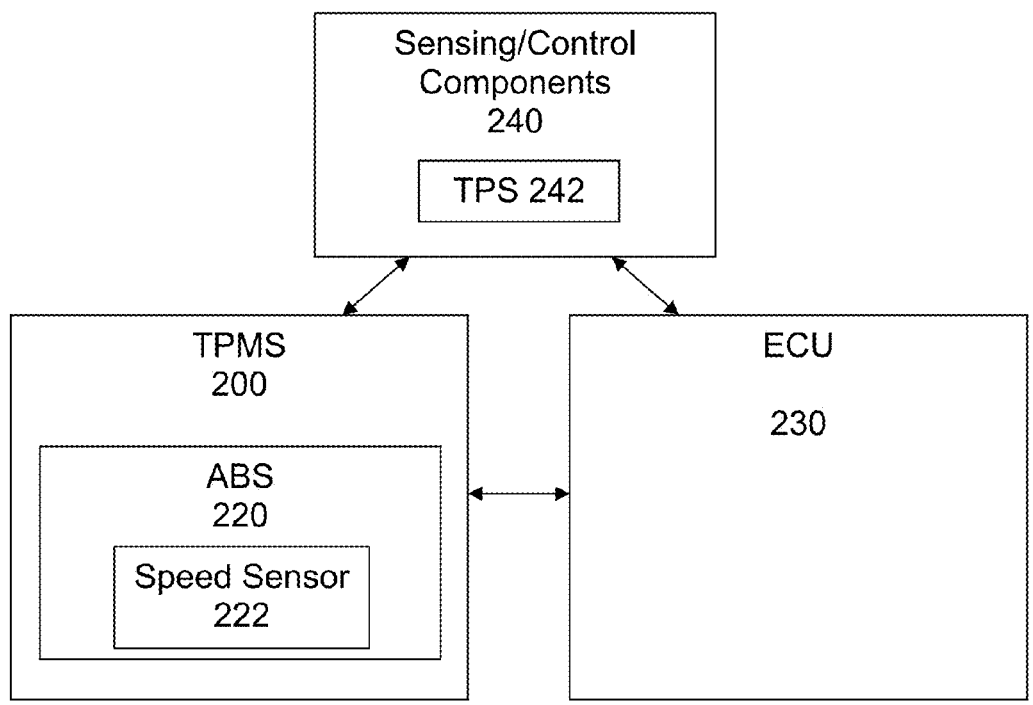
FIG. 9 is a block diagram of a tire pressure monitoring system, according to an embodiment.

Referring to FIG. 9, a block diagram is depicted of an TPMS wheel sensor system 200 in accordance with an embodiment. System 200 is or comprises an ABS sensor system 220 including a speed sensor 222 in embodiments. For example, system 200 can comprise an ABS sensor system 220 with additional circuitry and/or algorithms in order to process TPMS data in one embodiment, or system 200 can comprise additional circuitry, algorithms and/or other sense and control components 240 external to ABS sensor system 220 to carry out the processing of the TPMS data. For example, one or more sensors 114 can comprise components 240, or those sensors 114 can be considered to be part of TPMS 200 (for example, as described in FIG. 10), with or without additional sensors as part of components 240. In one embodiment, the additional circuitry and/or algorithms can be part of an ECU 230 or signal processing system, though they need not be in all embodiments. Various additional data sensing and control system components 240 can also be provided in embodiments and can comprise one or more of an accelerometer sensor and/or system, an inertia sensor or sensor cluster, an ambient environment sensor and/or system, a vehicle control system, and a tire pressure sensor and/or system, each of which can include various sensors and control arrangements known in the art to provide global vehicle parameter data, such as one or more of sensed data, operational data and/or control parameters for the vehicle. For example, sensing and control system components 240 can comprise tire pressure sensor (TPS) 242, or TPS 242 can be considered to be part of TPMS 200. Data sensing and control system components 240 is configured to transmit sensed data to TPMS 200 and ECU 230.

ECU 230 comprises, in an embodiment, a processor configured for signal processing and an electrically coupled memory for data storage and/or processor execution. The processor can be any suitable programmable device that accepts digital data as input, is configured to process the input according to instructions or algorithms, and provides results as outputs. In an embodiment, the processor can be a central processing unit (CPU) configured to carry out the instructions of a computer program. In other embodiments, the processor can be an Advanced RISC (Reduced Instruction Set Computing) Machine (ARM) processor or other embedded microprocessor. In other embodiments, processor 104 comprises a multi-processor cluster. The processor is therefore configured to perform at least basic selected arithmetical, logical, and input/output operations.

The memory can comprise volatile or non-volatile memory as required by the coupled processor to not only provide space to execute the instructions or algorithms, but to provide the space to store the instructions themselves. The memory can further comprise space to store data collected by data sensing and control system components 240. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing examples in no way limit the type of memory that can be used, as these embodiments are given only by way of example and are not intended to limit subject matter hereof. In other embodiments, the memory comprises a plurality of memory. For example, a first set of memory can be solely for use by the processor to store the instructions or algorithms, and a second set of memory can be solely for use in storing data collected by data sensing and control system components 240.

Figure 10:
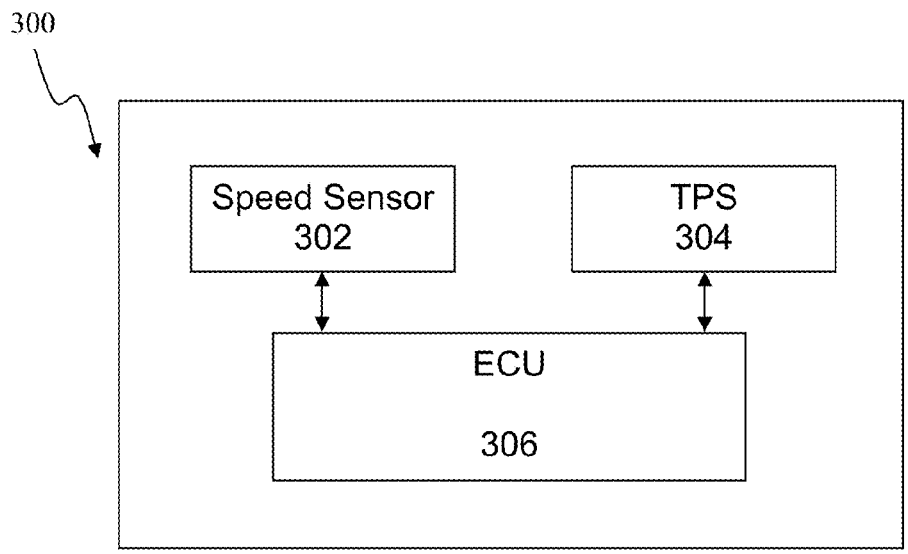
FIG. 10 is a block diagram of a tire pressure monitoring system, according to an embodiment.

Referring to FIG. 10, in an embodiment, a tire pressure management system 300 comprises a speed sensor 302, a plurality of tire pressure sensors (TPS) 304, and an ECU 306. In embodiments, speed sensor 302 is substantially similar to speed sensor 222 as described above. Speed sensor 302 is configured to monitor or record tire speed data and transmit that data to ECU 306.

In embodiments, TPS 304 is substantially similar to sensing and control system components 240, or particularly, in embodiments, TPS 242. In embodiments, TPS 304 is configured to measure or record tire pressure data and transmit the tire pressure data to ECU 306. In embodiments, TPS 304 is further configured to measure or record tire phase data.

In embodiments, ECU 306 is substantially similar to ECU 230 as described above. ECU 306 is operably coupled to speed sensor 302 and is configured to collect speed sensor 302 data. Likewise, ECU 306 is operably coupled to TPS 304 and is configured to collect TPS 304 data. ECU 306 comprises hardware circuitry and/or algorithms configured to receive and analyze the sensed data. In embodiments, ECU 306 is configured to analyze sensed data for automated tire localization.

Figure 11:
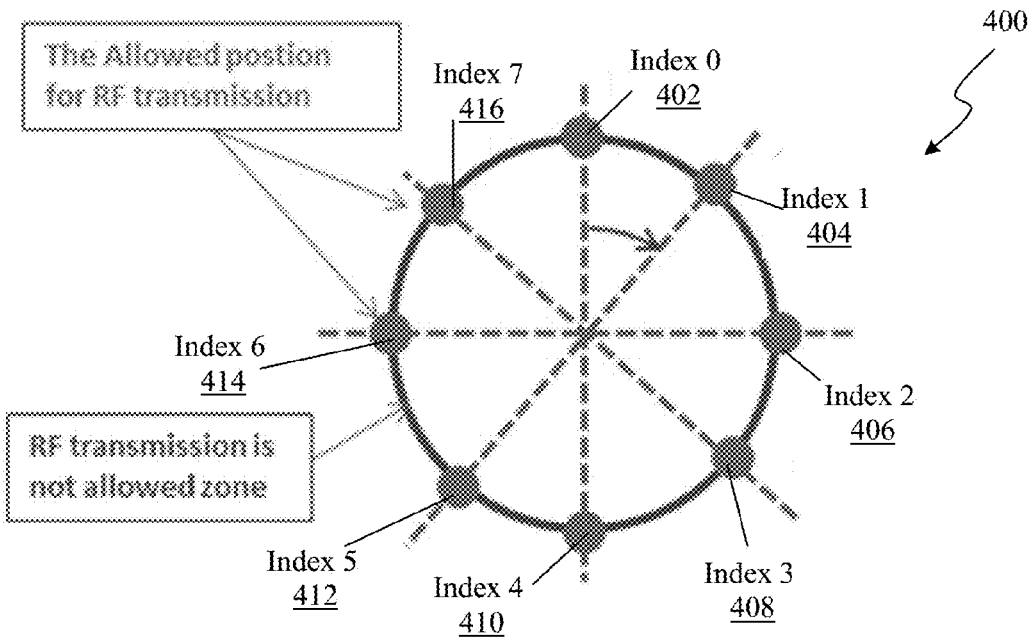
FIG. 11 is a block diagram of a tire including a plurality of predefined reference positions, according to an embodiment.

Referring to FIG. 11, a block diagram of a tire 400 including a plurality of predefined reference positions is depicted in accordance with an embodiment. Tire 400 is substantially similar to the aforementioned tires, including tire 112. The system of predefined reference positions can be utilized or implemented by any of the components, combination of components, or suitable alternative components described herein, in any suitable configuration as will be readily appreciated by one skilled in the art. The example systems provided are given only by way of example and are not intended to limit the scope of the invention.

Tire 400 comprises a plurality of indices or reference positions. For example, as illustrated in FIG. 11, tire 400 comprises "Index 0" at 402, "Index 1" at 404, "Index 2" at 406, "Index 3" at 408, "Index 4" at 410, "Index 5" at 412, "Index 6" at 414, and "Index 7" at 416. In the embodiment depicted, indices 402-416 are spaced equidistant from each other around the circumference of tire 400. In embodiments, the number and position of indices can vary, depending on, for example, the particular requirements of the application or transmission need. In embodiments, the positioning of the indices can be arbitrary. In embodiments, the positioning of the indices can be unevenly spaced.

Figure 12:
FIG. 12 is a block diagram of an RF frame for automatic tire localization, according to an embodiment.

Referring again to FIG. 10 for ease of explanation, according to embodiments, an RF transmission by TPS 304 to ECU 306 is allowed when TPS 304 reaches any of indices 402-416. According to embodiments, tire 400 and particularly, TPS 304 are configured for multiple transmission positions. For example, referring to FIG. 12, upon reaching Index 1 at 404, an RF frame transmission including TPS unique ID, tire pressure, temperature, battery status, and identifying data for Index 1 is transmitted by TPS 304. Likewise, upon reaching, for example, Index 2 at 406, an RF frame transmission including TPS unique ID, tire pressure, temperature, battery status, and identifying data for Index 2 is transmitted by TPS 304. Identifying data for the respective index indicates the position at which RF transmission has occurred. In embodiments, the identifying data for the index can be the index value itself. In other embodiments, an RF frame can comprise additional or fewer data fields. Identifying data for the respective index can be, for example, as few as 2 bits. In other embodiments, identifying data for the respective index can be 8, 16, 32 bits, or greater.

According to embodiments, RF frame transmission is not allowed when TPS 304 is in between indices 402-416. For example, as illustrated in FIG. 11, RF frame transmission is not allowed when TPS 304 is between Index 0 at 402 and Index 1 at 404. Likewise, RF frame transmission is not allowed when TPS 304 is between Index 1 at 404 and Index 2 at 406. The limitations on transmission are likewise present throughout the circumference of tire 400 in between indices 402-416.

In an embodiment, TPS 304 transmission can be as frequent or infrequent at indices 402-416 as desired. For example, TPMS 300 can be configured for TPS 304 transmission at every index, or at Index 0 at 402, Index 1 at 404, Index 2 at 406, Index 3 at 408, Index 4 at 410, Index 5 at 412, Index 6 at 414, and Index 7 at 416. In other embodiments, TPMS 300 can be configured for TPS 304 transmission at every other index, or for example, Index 0 at 402, Index 2 at 406, Index 4 at 410, and Index 6 at 414. In other embodiments, TPMS 300 can be configured for TPS 304 transmission at Index 0 at 402 and Index 4 at 410. Depending on the embodiment and desired transmission rate, each TPMS system can be configured for more or fewer TPS 304 transmissions at the respective indices.

In operation, each TPS 304 respectively sends an RF frame only when TPS 304 reaches one of the pre-defined multiple positions. In embodiments, the RF frame transmission is particularly during a tire localization phase. As described above with respect to FIG. 12, an RF frame includes index information corresponding to one of the pre-defined multiple positions. ECU 306 receives an RF frame from TPS 304.

According to embodiments, algorithms or methods for tire localization utilize a correlation between angular position and WSS counter. For example, the angle of TPS and the WSS counter for the same tire have the same period (i.e. rate of change), with a primary difference being phase and amplitude unit (i.e. WSS counter unit and angle unit). As a result, the phase difference between angle of the TPS and WSS counter is constant for the TPS and WSS sensor located in the same tire. The periodic function of the angle of the TPS will have a different period compared to the other periodic functions of the WSS counters of the other tires because rotation speed of each wheel is different due to, for example, cornering effects or differences in effective rolling radius. In embodiments, the differentiation of the constant phase difference between WSS counters and TPS angles can be done by ECU 306, which can receive RF frames and WSS data in real time.

Therefore, in finding the pair (TPS and WSS counter) providing the same phase difference, ECU 306 collects each WSS counter value at the moment when ECU 306 receives an RF frame (including a TPS ID, in an embodiment). ECU 306 is configured to calculate the angle difference between the index angle and an arbitrary reference angle and convert the difference to WSS counter units.

In an embodiment, this difference is calculated according to: ($\Delta$ angle/(360/number of WSS encoder teeth)).

This difference (in WSS counter units) is added to the acquired WSS counter using modular arithmetic to determine a corrected WSS counter. ECU 306 is further configured to accumulate the corrected WSS counter for a given duration. In embodiments, the accumulation duration can be on the order of 0.01 seconds. In other embodiments, the accumulation duration can be on the order of 0.1 seconds. In other embodiments, the accumulation duration can be on the order of 1 second. In other embodiments, the accumulation duration can be longer or shorter, depending on the application and system components. In an embodiment, ECU 306 is further configured to determine a WSS location that provides the maximum hit number at specific WSS counter value compared to other WSS counter values. In another embodiment, ECU 306 is further configured to determine a WSS location which provides a Gaussian distribution of WSS counters having a smaller sigma compare to other WSS counters.

In embodiments, if the allowed predefined reference positions are equally spaced (i.e. there is an equal angle between each of the neighboring positions, the angle spacing can be calculated by: 360 (degrees)/number of positions (NP). Therefore, if the number of positions is increased, for example, if NP=3600 (12 bit size angle index), then angle spacing is 0.1 degrees. In embodiments, a higher NP allows for more frequent RF frame transmissions. In embodiments, TPMS systems provide for an effectively continuous RF frame transmission. According to other embodiments, if NP=8 and the allowed predefined reference positions are equally spaced, then the size of the angle index is 4 bit. In other embodiments, as described above, for TPMS systems requiring no waiting time and an effectively continuous RF frame transmission, the size of the angle index is 8 bit.

Figure 13:
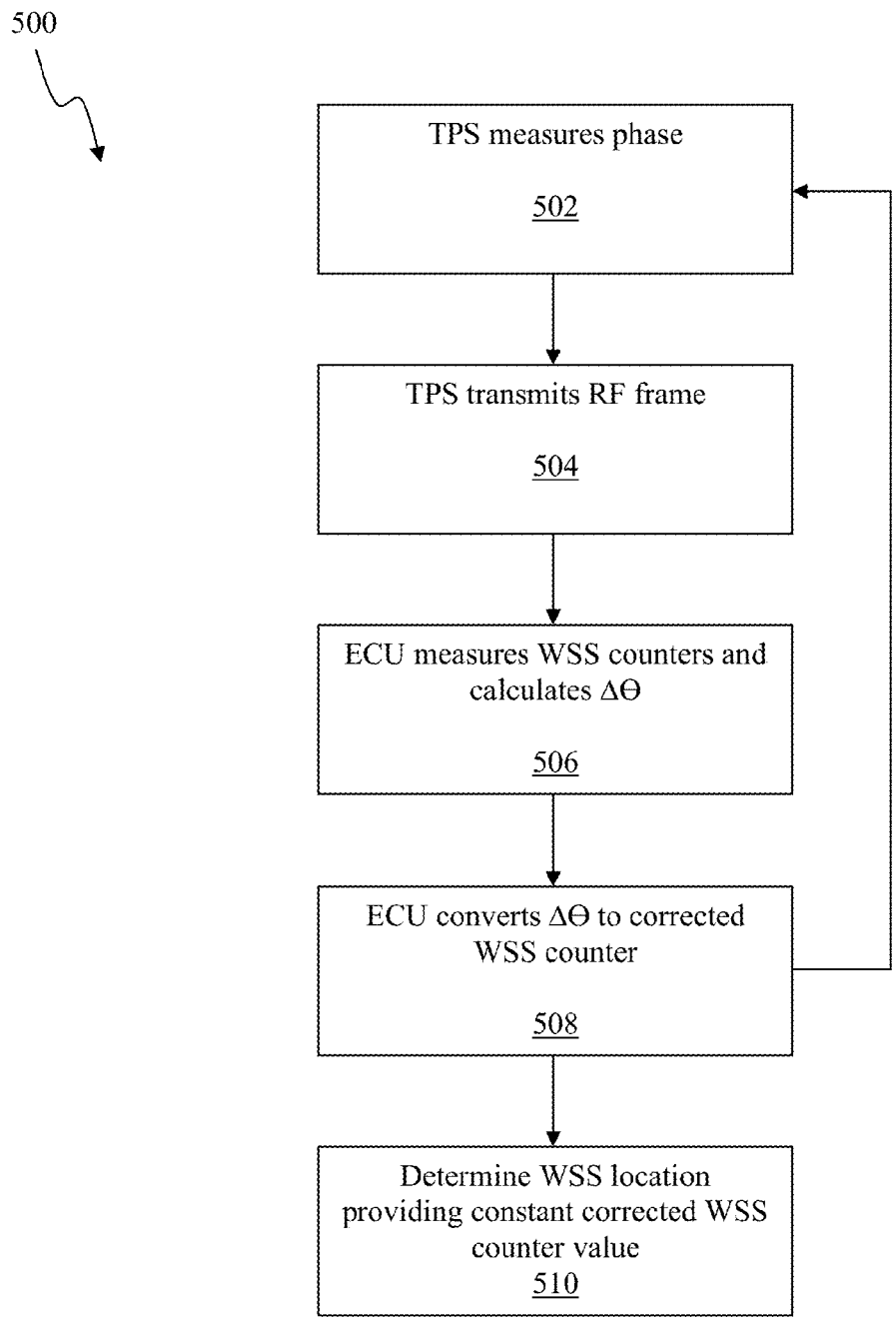
FIG. 13 is a flowchart of a method of automatic tire localization, according to an embodiment.
Figure 14:
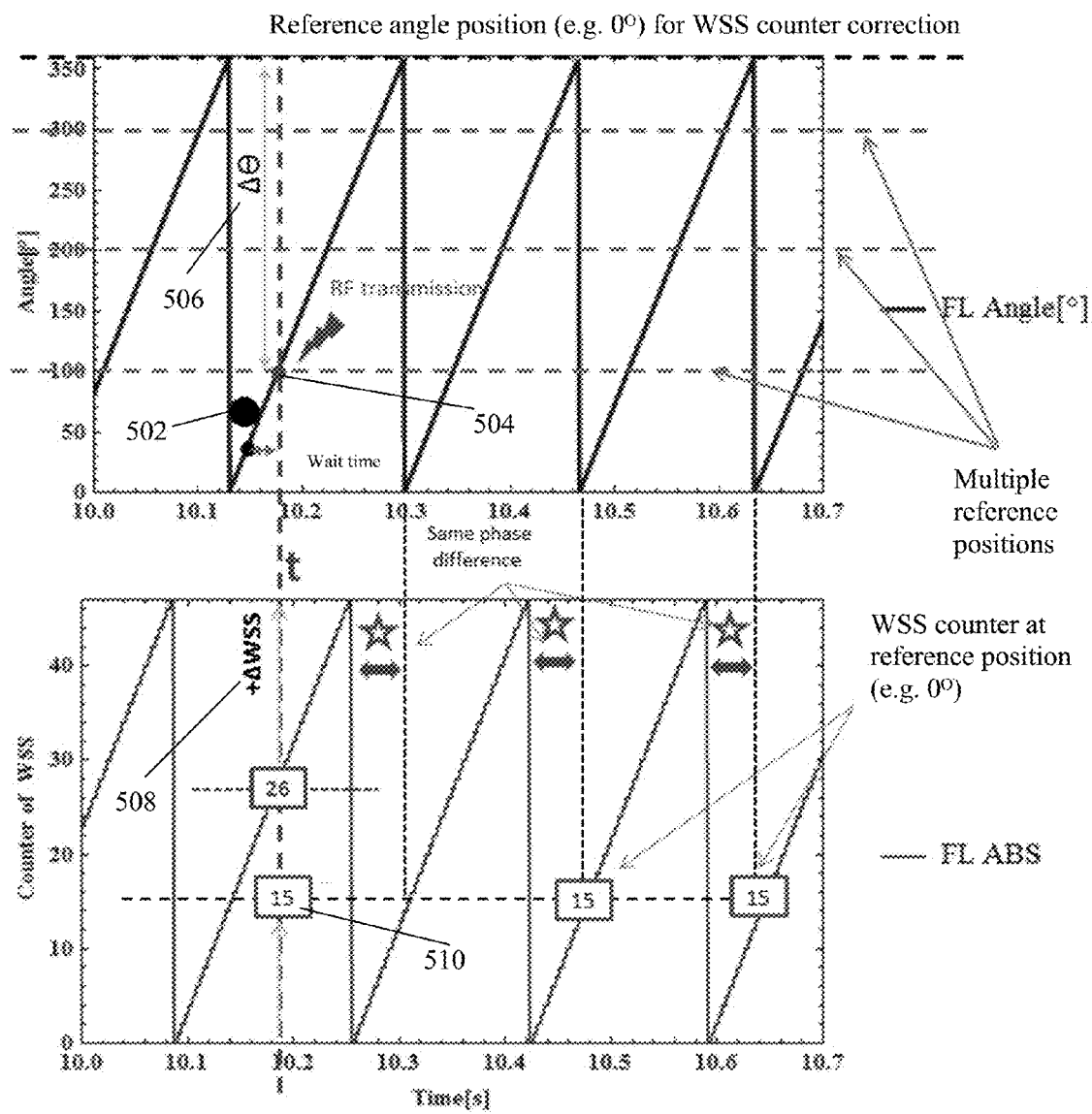
FIG. 14 is two annotated graphs depicting the relationship of angular position and WSS counter data against time for a front left vehicle tire for the method of automatic tire localization of FIG. 13, according to an embodiment.

Referring to FIG. 13, a method 500 of automatic tire localization for a TPMS is depicted. Referring to FIG. 14, two graphs depicting the relationship of angular position and WSS counter data against time for a front left vehicle tire for the method of automatic tire localization of FIG. 13 is depicted. The operations of method 500 are generally annotated on FIG. 14.

Again, for ease of explanation, method 500 is explained in the context of tire pressure management system 300, although TPMS 300 is provided only by way of example and any of the components, combination of components, or suitable alternative components described herein, in any suitable configuration as will be readily appreciated by one skilled in the art, can be utilized for method 500.

At 502, TPS 304 measures phase data. In an embodiment, phase data can be measured by TPS 304 at an arbitrary time. In other embodiments, TPS 304 measures phase data at a predetermined time relative to the respective reference positions. In embodiments, the measured phase data comprises associating the phase data with a reference position index. In embodiments, TPS measures additional data such as tire pressure, frequency, tire temperature, or battery status. In other embodiments, measuring phase data comprises identifying a reference position index at which pressure is measured.

At 504, TPS 304 transmits the measured phase data to ECU 306. In embodiments, the phase data comprises a reference position index. According to embodiments, at 504, TPS 304 reaches the next nearest reference position and transmits the measured phase data upon reaching that reference position. In other embodiments, TPS 304 reaches a predetermined reference position for which transmission is allowed (not necessarily the next nearest reference position). In embodiments, TPS 304 transmits the measured phase data as part of an RF frame, such as the RF frame depicted in FIG. 12. Accordingly, between 502 and 504, TPS 304 waits to transmit the RF frame containing the measured phase data.

At 506, ECU 306 measures the WSS counters for each of the tires at the moment ECU 306 receives the RF frame containing the measured phase data. The WSS counters are stored in ECU memory. Further at 506, ECU 306 calculates the angle difference ($\Delta\theta$) between the angle calculated from the angle index (transmitted as part of the RF frame) and a predefined arbitrary reference angle. Referring to FIG. 14, the reference angle=0°. In other embodiments, the reference angle can be any relative angle along the circumference of the tire. In embodiments, TPS IDs are stored with the corresponding RF frame or corresponding RF frame data.

At 508, ECU 306 converts the angle difference ($\Delta\theta$) to a "delta WSS counter" ($\Delta$WSS counter).

In an embodiment, $\Delta$WSS counter=($\Delta\theta$/(360/number of WSS encoder teeth)).

The delta WSS counter value therefore corresponds to $\Delta\theta$, in counter units. Delta WSS counter can be added to the WSS counter values measured at the moment ECU received the RF frame to determine a "corrected WSS counter."

In an embodiment, corrected WSS counter=(WSS counter+ $\Delta$WSS counter) modulo (number of WSS encoder teeth).

From 508, method 500 can iterate through 502 to 508, repeatedly storing the corrected WSS counters with TPS IDs or TPS identifying data. At 510, ECU 306 determines the TPS that provides a constant corrected WSS counter value. In embodiments, ECU 306 can match each TPS ID to the constant corrected WSS counter value. For example, in FIG. 14, the corrected WSS counter value of "15" is constant across multiple iterations. The corrected WSS counter value of "26" does not match the constant value pattern and therefore does not correspond to the TPS ID of the tire of the corrected WSS counter value of "15." In embodiments, only two iterations of 502 to 508 are needed to determine a constant corrected WSS counter value. In other embodiments, a plurality of iterations of 502 to 508 can be utilized to determine a constant corrected WSS counter value. At 510, then, the location of the tire for a particular TPS can be identified.

Figure 15:
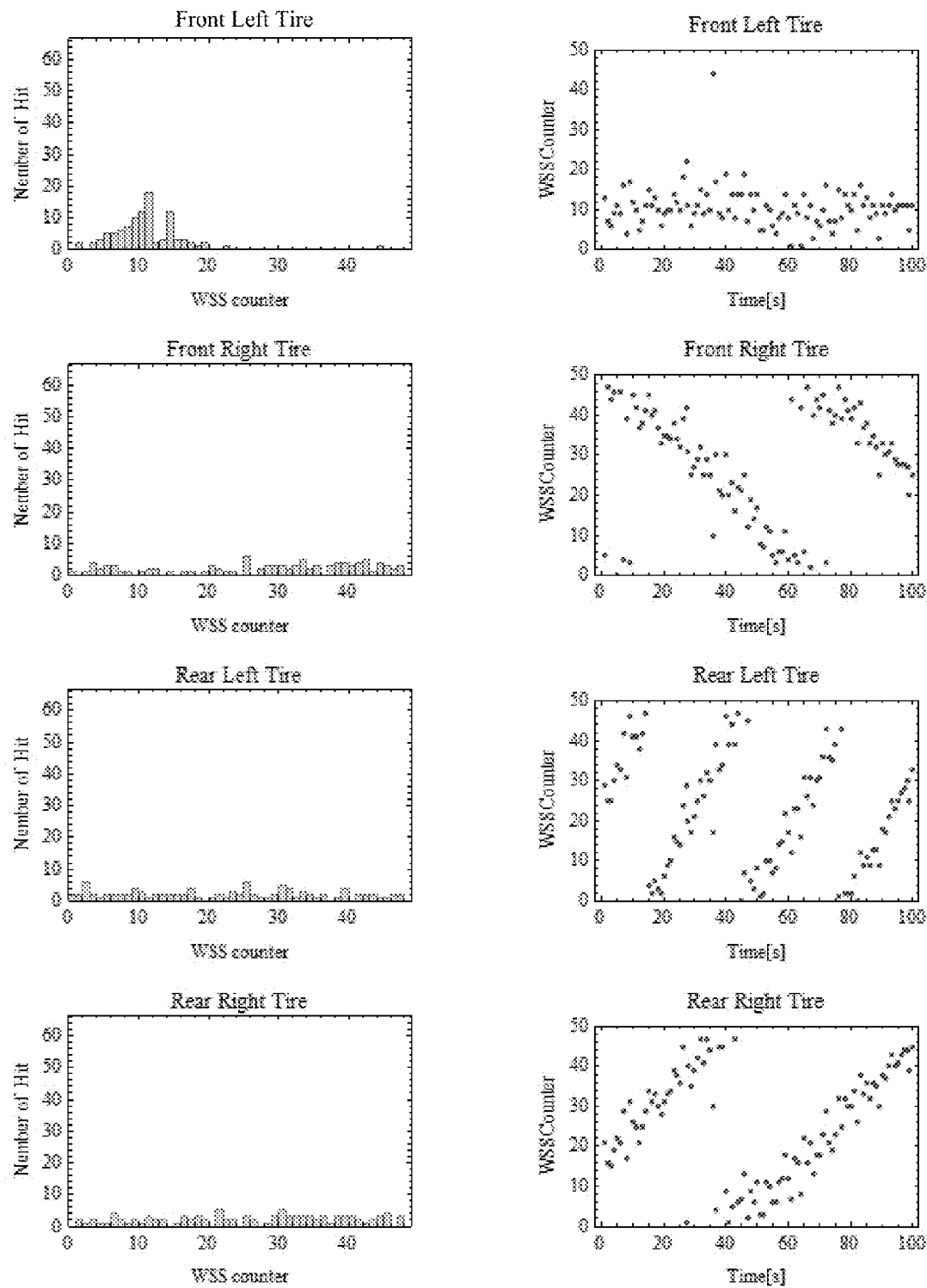
FIG. 15 is series of graphs of the number of hits against a corrected WSS counter and a corrected WSS counter against time for each of the front left tire, front right tire, rear left tire, and rear right tire for set of tire conditions, according to an embodiment.

Referring to FIG. 15, a series of graphs of the number of hits against a corrected WSS counter and a corrected WSS counter against time for each of the front left tire, front right tire, rear left tire, and rear right tire for set of tire conditions are depicted. According to an embodiment, in the set of tire conditions of FIG. 15, the front left TPS transmits every 1 second up to 100 times with an angle index representative of a tire having multiple reference positions. 100 RF frames are collected and corrected WSS counter values are calculated as described above. The tolerance of angle accuracy=30° (1 sigma), representative of a noisy effect. Effective rolling radius for each tire {FL, FR, RL, RR}={0.301 m, 0.302 m, 0.299 m, 0.300 m}. The tangential speed for each tire is the same 32 km/h. The sampling period to calculate the angle information and frequency is approximately ~2.5 revolution. The processing time is considered ~50 ms+random delay (1~2 ms) to calculate the angle. The number of reference positions is 32 (index bit size 5 bit), and the reference positions are equally spaced. A 48 tooth WSS encoder is utilized.

Referring to the graphs of the Front Left Tire, the distribution of the corrected WSS counter value, particularly, the number of hits of the WSS counter value are focused a specific counter (~10 count). The other tire counter values appear as a random distribution. TPMS systems and methods according to embodiments can utilize this data to derive that this particular RF frame comes from the front left tire sensor.

Figure 16:
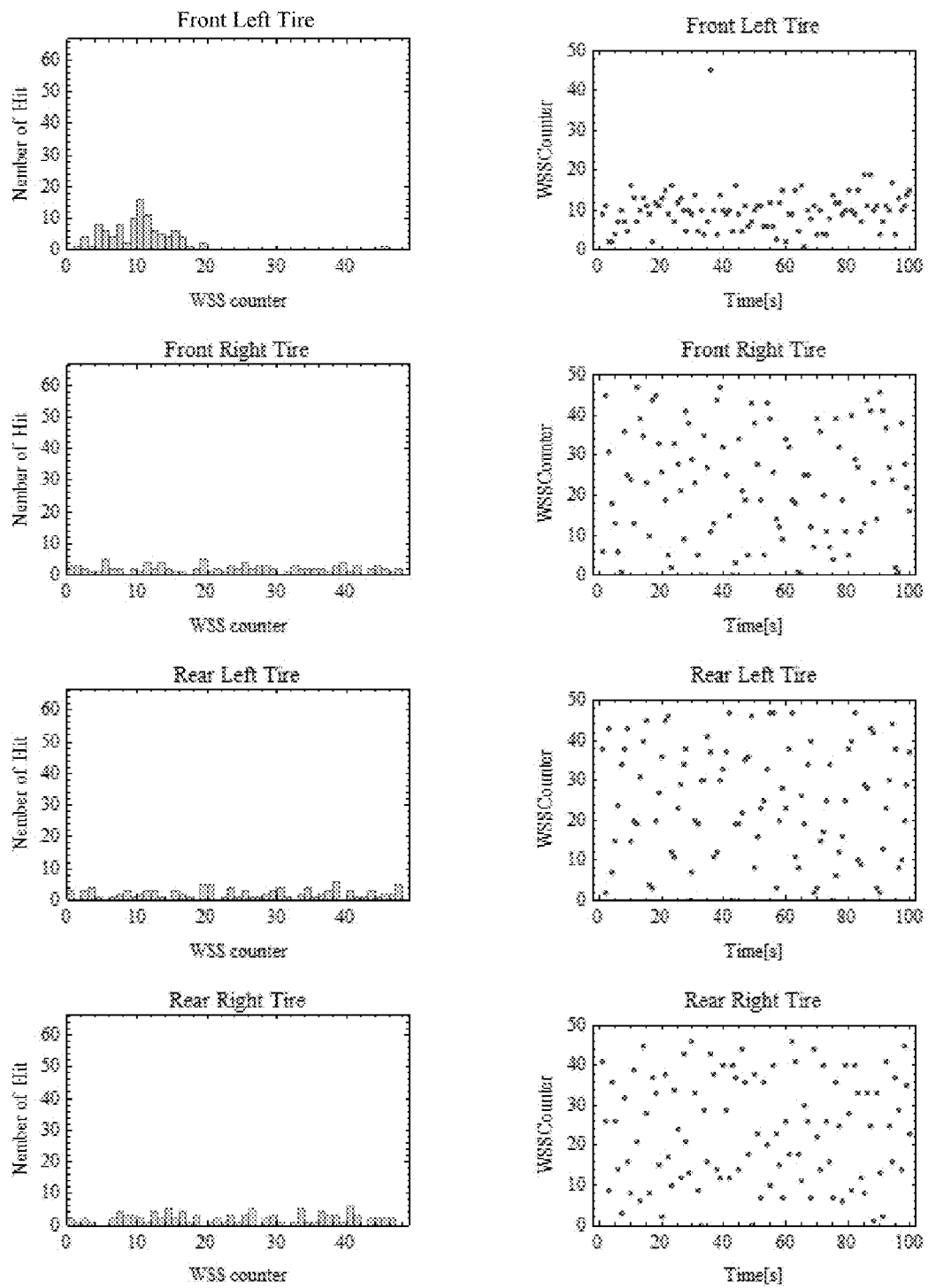
FIG. 16 is series of graphs of the number of hits against a corrected WSS counter and a corrected WSS counter against time for each of the front left tire, front right tire, rear left tire, and rear right tire for set of tire conditions, according to an embodiment.

Referring to FIG. 16, if the tangential speed for each tire are different, the differences are even more pronounced. According to an embodiment, the set of tire conditions is substantially the same as those described with respect to FIG. 15, but the tangential speed of each tire is {FL, FR, RL, RR}={32.2 km/h, 31 km/h, 33 km/h, 30 km/h}. Referring to the graphs of the Front Left Tire for FIG. 16, the distribution of the corrected WSS counter value, particularly, the number of hits of the WSS counter value are focused a specific counter (~10 count). The other tire counter values appear as a random distribution.

Figure 17:
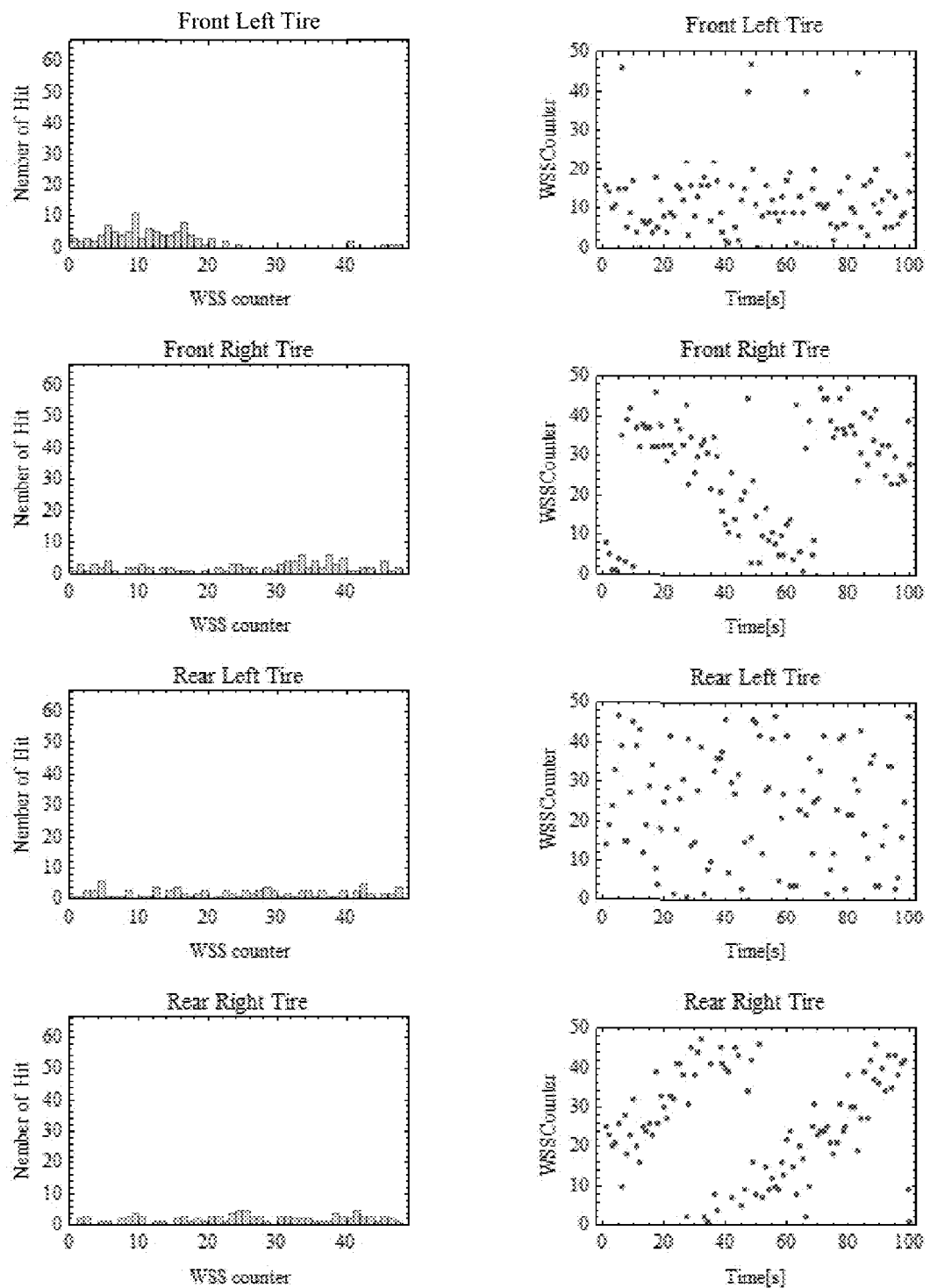
FIG. 17 is series of graphs of the number of hits against a corrected WSS counter and a corrected WSS counter against time for each of the front left tire, front right tire, rear left tire, and rear right tire for set of tire conditions, according to an embodiment.

Referring to FIG. 17, even if the angle index error is large, systems and methods according to embodiments can still perform localization. According to an embodiment, the set of tire conditions is substantially the same as those described with respect to FIG. 15, but the angle index error comprises a large error. In embodiments, the error is 1 sigma=50°. Referring to the graphs of the Front Left Tire for FIG. 17, the distribution of the corrected WSS counter value, particularly, the number of hits of the WSS counter value are focused a specific counter (~10 count). The other tire counter values appear as a random distribution. According to embodiments, the magnitude of error allowed in the index measurement can be a function of the number of data collection points. For example, if the collection of index measurements is large, the allowed error can be up to 1 sigma=~90°.

In a feature and advantage of embodiments, systems and methods have less waiting time between TPS transmissions than, for example, approaches having a single predetermined reference position. TPS transmissions of RF frames can be sent at any of a plurality of predefined multiple positions. As a result, TPS data is fresher and more accurate, resulting in more accurate tire localization. Moreover, phase error is reduced compared to approaches having a long waiting time. Further, power consumption of the TPS and operably coupled components is reduced, as the TPS can enter a low energy mode, as there is needs for high resolution or time tracking are reduced or even eliminated.

In another feature and advantage of embodiments, systems and methods have a smaller RF frame length than approaches incorporating time data into the RF frame (where, for example, there are no predetermined positions). By incorporating index or reference position data, time data is not required in order for the ECU to conduct tire localization. With a shorter RF frame, the TPMS components draw less current, thereby saving power. Further, the failure rate for RF transmission and receiving is reduced with a shorter frame.

In another feature and advantage of embodiments, systems and methods require less software or algorithm complexity, as well as circuitry complexity, in an ECU. For example, because the WSS information needed for tire localization in embodiments corresponds to the moment at which the RF frame is sent, no previous WSS data needs to be stored or compared. The ECU therefore does not need to record WSS counter values for each wheel and store the WSS counter values for some duration, thereby freeing up memory space. Likewise, the ECU receiver does not need any complex processing instructions in order to search the WSS counter values for each wheel.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A tire localization system comprising:
    a plurality of wheel speed sensors each associated with a respective wheel of a vehicle and configured to provide a wheel speed signal that encodes a wheel speed counter value;
    a plurality of tire pressure sensors each associated with a respective wheel of the vehicle and configured to provide an index indicating one of a plurality of predefined angular positions of the wheel; and
    an electronic control unit operably coupled to the plurality of wheel speed sensors and the plurality of tire pressure sensors and configured to localize each of the plurality of tire pressure sensors to a particular wheel of the vehicle by:
        calculating an angle difference from an angle of the index and a reference angle;
        converting the angle difference to a delta wheel speed counter;
        generating a corrected wheel speed counter for each of the plurality of the wheels by adding the delta wheel speed counter to a wheel speed counter value provided by each of the plurality of the speed sensors; and
        identifying a consistent corrected wheel speed counter value for one of the tire pressure sensors.

2. The tire localization system of claim 1, wherein the plurality of wheel speed sensors are part of an antilock braking system (ABS).

3. The tire localization system of claim 1, wherein each tire pressure sensor is configured to measure a pressure of the tire.

4. The tire localization system of claim 1, wherein each of the tire pressure sensors are operably coupled to the electronic control unit through radio frequency (RF), and wherein the index of the tire pressure sensor location is provided to the electronic control unit in an RF frame packet, the RF frame packet further comprising a tire pressure sensor identifier.

5. The tire localization system of claim 1, wherein the index is one of a plurality of indices spaced along the wheel of the vehicle.

6. The tire localization system of claim 5, wherein the plurality of indices is evenly spaced along the wheel of the vehicle.

7. The tire localization system of claim 5, wherein the plurality of indices is unevenly spaced along the wheel of the vehicle.

8. The tire localization system of claim 5, wherein the tire pressure sensor is configured to provide the index only when the tire pressure sensor is at one of the plurality of indices.

9. The tire localization system of claim 1, wherein the index is a data type having between two and thirty-two bits.

10. A method of localizing a wheel in a tire pressure monitoring system (TPMS), the method comprising, with an electronic control unit:
receiving, from a plurality tire pressure sensors, an index location, wherein each index location is one of a plurality of indices spaced along a wheel of the vehicle related to the tire pressure sensor;
receiving wheel speed data encoding a wheel speed counter value for each of the plurality of the wheels of the vehicle;
calculating an angle difference from an angle of the index location and a reference angle;
converting the angle difference to a delta wheel speed counter;
generating a corrected wheel speed counter from the delta wheel speed counter for each of the plurality of the wheels of the vehicle; and
identifying a consistent corrected wheel speed counter value for one of the tire pressure sensors corresponding to one of the plurality of wheels of the vehicle.

11. The method of claim 10, wherein converting the angle difference to a delta wheel speed counter comprises dividing the angle difference into a proportion of wheel speed sensor encoder teeth.

12. The method of claim 10, wherein generating a corrected wheel speed counter comprises adding a wheel speed counter to the delta wheel speed counter, modulo a number of wheel speed sensor encoder teeth.

13. The method of claim 10, wherein identifying a consistent corrected wheel speed counter value for one of the tire pressure sensors comprises iterating through:
calculating an angle difference from an angle of the index location and a reference angle;
converting the angle difference to a delta wheel speed counter; and
generating a corrected wheel speed counter from the delta wheel speed counter for each of the plurality of the wheels of the vehicle, a plurality of times to determine a plurality of corrected wheel speed counter values.

14. The method of claim 13, wherein the consistent corrected wheel speed counter value is determined by a clustering of corrected wheel speed counter values.

15. A control unit comprising:
a data input configured to receive an index transmitted by a tire pressure sensor mounted on a wheel indicating one of a plurality of predefined angular positions of a wheel and a plurality of wheel speed information that encodes a wheel speed counter value from a plurality of wheel speed sensors; and
a calculation unit configured to:
select one of a plurality of predefined angular positions based on the received index,
calculate an angle difference from the selected angular position of the index and a reference angle;
convert the angle difference to a delta wheel speed counter;
generate a corrected wheel speed counter for each of the plurality of the wheels by adding the delta wheel speed counter to a wheel speed counter value provided by each of the plurality of the speed sensors; and
identify a consistent corrected wheel speed counter value for one of the tire pressure sensors.

16. The control unit of claim 15, wherein the plurality of wheel speed sensors are part of an antilock braking system (ABS).

* * * * *